United States Patent
Vettenranta (10) Patent No.: US 11,655,589 B2
(45) Date of Patent: May 23, 2023

(54) METHOD AND A SYSTEM FOR ADJUSTING PH OF GREEN LIQUOR DREGS

(71) Applicant: Valmet Technologies Oy, Espoo (FI)

(72) Inventor: Aino Vettenranta, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/633,055

(22) PCT Filed: Aug. 18, 2020

(86) PCT No.: PCT/FI2020/050536
§ 371 (c)(1),
(2) Date: Feb. 4, 2022

(87) PCT Pub. No.: WO2021/032913
PCT Pub. Date: Feb. 25, 2021

(65) Prior Publication Data
US 2022/0275578 A1    Sep. 1, 2022

(30) Foreign Application Priority Data

Aug. 22, 2019 (FI) ..................................... 20195692

(51) Int. Cl.
*D21C 11/00* (2006.01)
*D21C 11/10* (2006.01)

(52) U.S. Cl.
CPC .......... *D21C 11/0071* (2013.01); *D21C 11/10* (2013.01)

(58) Field of Classification Search
CPC ............................ D21C 11/0071; D21C 11/08
See application file for complete search history.

(56) References Cited

U.S. PATENT DOCUMENTS

| | | |
|---|---|---|
| 3,635,670 A | 1/1972 | Kennedy |
| 5,628,875 A | 5/1997 | Lidén et al. |

(Continued)

FOREIGN PATENT DOCUMENTS

| | | |
|---|---|---|
| EP | 1777338 A1 | 4/2007 |
| FI | 117125 B | 6/2006 |

(Continued)

OTHER PUBLICATIONS

Fenske et al., Reduction of Odorous Emissions from Kraft Pulp Mills Using Green Liquor Dregs, Aug. 2000, IPST Technical Paper Series No. 800. (Year: 2000).*

(Continued)

*Primary Examiner* — Anthony Calandra
(74) *Attorney, Agent, or Firm* — Alston & Bird LLP (57) ABSTRACT

The specification relates to a method and a system for adjusting pH of green liquor dregs. The method comprises contacting a slurry containing green liquor dregs (100, 200, 300, 400, 500) with flue gas (101, 201, 301, 401, 501). The system comprises a recovery boiler (105) configured to burn black liquor to produce smelt, a smelt dissolving tank (107) configured to dissolve the smelt to produce green liquor comprising green liquor dregs, and a green liquor clarifier/filter (103) and/or a dregs filter (104) configured to separate (Continued)

a slurry containing green liquor dregs (100, 200, 300, 400, 500) from the green liquor. The system further comprises a vessel (102, 202, 302, 402) configured to receive a slurry containing green liquor dregs (100, 200, 300, 400, 500) and a gas inlet (210, 310, 410, 510) configured to convey flue gas (101, 201, 301, 401, 501) to be contacted with the slurry containing green liquor dregs (100, 200, 300, 400, 500).

17 Claims, 3 Drawing Sheets

(56) References Cited

U.S. PATENT DOCUMENTS

| | | | |
|---|---|---|---|
| 5,705,031 | A | 1/1998 | Angevine |
| 5,788,813 | A | 8/1998 | Engdahl et al. |
| 2008/0219912 | A1 | 9/2008 | Olsen et al. |
| 2009/0304921 | A1 | 12/2009 | Olsen et al. |
| 2016/0279568 | A1 | 9/2016 | Stuever |

FOREIGN PATENT DOCUMENTS

| | | | | |
|---|---|---|---|---|
| FI | 20185143 | A1 | 8/2019 | |
| PL | 219250 | B1 * | 3/2015 | ............ D21C 11/02 |
| SE | 528884 | C2 * | 3/2007 | ............ B01D 53/48 |
| WO | WO-88/06203 | A1 | 8/1988 | |
| WO | WO-2010011223 | A1 * | 1/2010 | ............ B01D 53/38 |
| WO | WO-2015/150626 | A1 | 10/2015 | |
| WO | WO-2019/077202 | A1 | 4/2019 | |

OTHER PUBLICATIONS

Lane et al., Reduction of odorous reduced sulfur emissions from kraft pulp mills using green liquor dregs, Oct. 2005,TAPPI Journal., vol. 4:No. 10. (Year: 2005).*

Bhatia et al., Air pollution control in kraft pulp mills,1978, American Industrial Hygiene Association Journal, (39) 2, p. 83-93. (Year: 1978).*

Bhatia et al., Scrubbing of Recovery Furnace Stack Gases with Alkaline Suspensions of Activated Carbon,1973, European Liaison Committee for Cellulose and Paper, Proc. EUCEPA Conf., 15th, Harmonizing Pulp Paper Ind. Environ., Rome, p. 667-697. (Year: 1973).*

International Searching Authority, International Search Report and Written Opinion for International Application No. PCT/FI2020/050536, dated Nov. 19, 2020, (15 pages), European Patent Office, Rijswijk, Netherlands.

International Preliminary Examining Authority, Second Written Opinion for International Application No. PCT/F12020/050536, dated Jul. 23, 2021 (6 pages), European Patent Office, Rijswijk, Netherlands.

International Preliminary Examining Authority, International Preliminary Report on Patentability for International Application No. PCT/FI2020/050536, dated Oct. 12, 2021 (17 pages), European Patent Office, Munich, Germany.

Nurmesniemi, Hannu et al. *A Case Study of Waste Management at the Northern Finnish Pulp and Paper Mill Complex of Stora Enso Veitsiluoto Mills,* Waste Management, vol. 27, No. 12, Jan. 1, 2007), pp. 1939-1948, XP022273710, ISSN: 0956-053X, DOI: 10.1016/j.wasman.2006.07.017.

* cited by examiner

METHOD AND A SYSTEM FOR ADJUSTING PH OF GREEN LIQUOR DREGS

CROSS REFERENCE TO RELATED APPLICATIONS

This application is a National Stage Application, filed under 35 U.S.C. § 371, of International Application No. PCT/FI2020/050536, filed Aug. 18, 2020, which claims priority to Finland Application No. 20195692, filed Aug. 22, 2019; the contents of both of which are hereby incorporated by reference in their entirety.

BACKGROUND

Related Field

This specification relates to a method and a system for treating green liquor dregs of a pulp mill. The specification also relates a method and a system for processing the dregs into a format having a pH that allows reuse of the dregs. Further, the specification relates to a method and a system for capturing at least part of the $CO_2$ emissions of a pulp mill.

Description of Related Art

Lime kiln dregs form the largest fraction of landfilled waste from Finnish pulp and paper mills. Dregs originate from green liquor handling. Dregs refer to suspended particles contained by the green liquor. It is estimated that 5-20 kg of dregs is produced against each air-dry ton of pulp produced.

Currently, there is no reasonable use for green liquor dregs. It may not be possible to use dregs as filling material due to their high pH. High pH also prevents the use of dregs in soil improvement and as fertilizer. To some extent, the high pH can be utilized in controlling the pH of acidic waste waters, but the heavy metal concentrations of the dregs may prevent this. At the moment, most dregs go to waste, and large landfilled fractions cause significant costs to pulp mills.

On the other hand, the public opinion on the sustainability of the pulp production has recently been compromised in Finland due to the conflicting information available on carbon sinks. The possibility of $CO_2$ capture would make many pulp mills clearly $CO_2$ negative, thus improving the public opinion.

BRIEF SUMMARY

It is an aim of this specification to provide a method and a system for processing green liquor dregs of a pulp mill into a format that allows reuse of the dregs. Further, aim is to provide a method and a system for capturing at least part of the $CO_2$ emissions of a pulp mill.

According to an embodiment, a method for adjusting pH of green liquor dregs is provided. The method comprises contacting a slurry containing green liquor dregs with flue gas. The slurry containing green liquor dregs originates from a green liquor clarifier/filter and/or a dregs filter configured to separate the slurry containing green liquor dregs from green liquor. A dry solids content of the slurry containing green liquor dregs is from 1 to 40 wt. %. The flue gas contains carbon dioxide, and pH of the green liquor dregs after contacting with the flue gas is between 7-9.

BRIEF DESCRIPTION OF THE FIGURES

The figures are schematic. The figures are not in any particular scale.

DETAILED DESCRIPTION OF VARIOUS EMBODIMENTS

The solution is described in the following in more detail with reference to some embodiments, which shall not be regarded as limiting.

In this description and claims, the percentage values relating to an amount of a material are percentages by weight (wt. %) unless otherwise indicated. Term "comprising" may be used as an open term, but it also comprises the closed term "consisting of". The following reference numbers and denotations are used in this specification:

adt air-dry ton
100 slurry containing green liquor dregs
101 flue gas
102 vessel
103 green liquor clarifier/filter
104 dregs filter
105 recovery boiler
106 treated green liquor dregs
107 smelt dissolving tank
200 slurry containing green liquor dregs
201 flue gas
202 vessel
206 treated green liquor dregs
208 gas sparger
209 gas
210 gas inlet
216 pH sensor
218 line
219 line
300 slurry containing green liquor dregs
300a line
301 flue gas
302 vessel
302a bottom part of the scrubber
302b upper part of the scrubber
306 treated green liquor dregs
309 gas
310 gas inlet
317 nozzle
318 line
400 slurry containing green liquor dregs
401 flue gas
402 vessel
406 treated green liquor dregs
409 gas
410 gas inlet
411 injector arrangement
412 pump arrangement
418 line
419 line 500 slurry containing green liquor dregs
501 flue gas
510 gas inlet
511a injector
513 jet nozzle
514 jet
515 second chamber
520 first chamber In a chemical pulp production cooking is used for recovering fibres from chips in a digester by using chemicals and heat in order to remove fibre binding lignin and, in addition, to remove wood extractives which may later cause foaming and precipitants in the process. Therefore, chemicals which dissolve as much lignin and as little cellulose as possible are typically used in the pulping process. Typically, the process for manufacturing bleached chemical pulp comprises pulping, washing, screening, bleaching, and cleaning stages. Nowadays sulphate cooking, also called Kraft cooking or pulping, which uses a mixture of sodium hydroxide (NaOH) and sodium sulphide ($Na_2S$), is the most commonly used pulp production method. The cooking process may be based on batch cooking or continuous cooking comprising a digester or several digesters. The chemicals required for this process are used in a mixture denoted as white liquor. In pulping, sodium sulphide and sodium hydroxide of white liquor react with water forming hydrosulphide ($HS^-$) and hydroxyl ($OH^-$) groups.

As a result of the pulping process, black liquor is formed. The pulp coming from the digester contains both fibres and spent cooking liquor (black liquor). A large amount of chemicals is used in a chemical pulp production, and recovery and re-use of these chemicals is required. The main process steps in a chemical recovery system of a pulp mill are evaporation of the black liquor, burning of the evaporated liquors in a recovery boiler and causticizing, including lime generation.

Recycling of spent cooking chemicals in a pulp mill is denoted as a liquor cycle or chemical recovery cycle of the pulp mill. A recovery boiler is used to recover the cooking chemicals. In particular, the recovery boiler aims to recover sodium carbonate and sodium sulphide. Organic fraction of the black liquor is oxidized and the used cooking chemicals are reduced in the recovery boiler thus forming a molten 'smelt' that may be dissolved into a liquid. Thus formed liquid may be denoted as green liquor due to a characteristic green colour. Green liquor containing for example $Na_2S$ and NaHS is an essential part of the liquor cycle taking care of the recovery of chemicals used in the pulping. Green liquor may be used to prepare white liquor for the pulping process.

The green liquor contains dregs, i.e. solid material. Green liquor handling refers to a process wherein the green liquor coming from a smelt dissolver is made into a proper feed for recausticizing. The green liquor handling typically includes separation of dregs from the green liquor, cooling of the green liquor and treating of the dregs for proper disposal.

The green liquor may be treated with a clarifier or a filter in order to separate the dregs. Alternatively or additionally, the dregs may be separated and/or dried by a filter.

A conventional method of green liquor purification is sedimentation of the dregs in a clarifier. Clarifying by sedimentation uses density difference between the dregs and liquid in green liquor. A clarifier may be an open-top, cylindrical tank. The dregs that are heavier than the liquid settle to the bottom of the clarifier to form a sludge. The sludge may also be called a slurry. The clear liquor in upper part of the clarifier may be subsequently decanted.

A green liquor clarifier may have a clarifier section (lower) and a storage section (upper). Green liquor may be fed through a feed pipe to a feed cylinder in the clarifier section. A vapor outlet pipe is located in the feed cylinder inside the tank. In the clarifier, the dregs are separated from the green liquor and settle to the bottom. A rotating rake at the bottom of the clarifier moves the dregs sediment towards a well for removal, from which the dregs may be pumped to a dregs filter for washing and drying. Typically, the dried and cleaned dregs are then discharged from the process.

In bleaching processes magnesium is used in amounts that influence the composition of dregs. Magnesium may cause problems in green liquor clarifying because it is present as magnesium hydroxide in alkaline conditions.

It forms very fine particles that are difficult to settle without using flocculation aids. In pulp mills using renewable fuels, such as gasified bark, the amount of magnesium hydroxide is even higher.

Alternatively to clarifying, filtration may be utilized for separating the dregs from the green liquor by a green liquor filter. The process may be based on driving green liquor through a filter medium by a pressure difference. The filter medium may comprise for example a filter cloth, a lime mud cake, a dregs cake, or a mixture of lime mud and dregs.

After clarifying by the green liquor clarifier or filtrating by the green liquor filter, the dregs may be further separated and/or dried by a dregs filter. Lime mud either mixed with the dregs or as precoat on a precoat filter may be used as a filtering aid.

The green liquor from which the dregs are separated is causticized with lime, in which process sodium carbonate ($Na_2CO_3$) in the green liquor is converted to NaOH in white liquor, which can then be used for cooking liquor.

After clarifying and/or filtering the dregs may be washed with warm water. After washing the dregs are typically dried, i.e. dewatered. Dewatering of the dregs may be performed for example by a vacuum precoat filter or a chamber filtering press. Washing of the dregs and final dewatering may also be performed simultaneously with green liquor purification when using a pressure precoat disc filter for green liquor purification.

Green liquor dregs refers to dregs originating from green liquor handling. It is estimated that 5-20 kg of dregs is produced against each air-dry ton of pulp produced. The amount of dregs produced may be 10-30 kg/adt pulp in a case lime mud as a filtering aid is used, as the lime mud causes increase in the amount of the dregs produced. The amount of dregs in green liquor varies from one mill to another, but typically it may be from 600 to 2000 mg/l.

Green liquor dregs have high pH. Typically the pH of the dregs is 10-13. Main oxides in green liquor dregs are CaO, MgO and $Na_2O$. Alkali metals and alkaline earth metals are typically found in the form of carbonates, sulphites, hydroxides and oxides in the dregs. The composition of dregs varies depending on factors such as closure of the mill cycles, delignifying process and pulping raw materials.

In an example, the green liquor dregs may contain 1000-2000 mg/kg of Al, 100 000-350 000 mg/kg of Ca, 1000-20 000 mg/kg of Fe, 9000-100 000 mg/kg of Mg, 5000-30 000 mg/kg of Mn, 6000-100 000 mg/kg of Na and 4000-60 000 mg/kg of S.

This specification provides a method and a system for adjusting pH of green liquor dregs originating from green liquor handling, wherein the dregs are processed into a format having a pH that allows reuse of the dregs. Further, aim is to capture at least part of the $CO_2$ emissions of the pulp mill, optionally together with possible $SO_2$ and acidic gases of the pulp mill.

According to an embodiment, a method for adjusting pH of green liquor dregs is provided. The method comprises contacting a slurry containing green liquor dregs with flue gas. In this context, flue gas contains carbon dioxide ($CO_2$). Typical flue gases contain at least 5 vol-% carbon dioxide. Contacting the slurry containing green liquor dregs with the flue gas lowers the pH of the green liquor dregs, thus allowing reuse of the dregs.

The slurry containing green liquor dregs refers to a slurry containing dregs that have not been dewatered. The term "slurry" refers to a mixture of solids having specific gravity greater than 1 suspended in liquid, usually water. Within context of this description the slurry is aqueous. The non-dewatered dregs may also be denoted as wet green liquor dregs.

Figure 1:
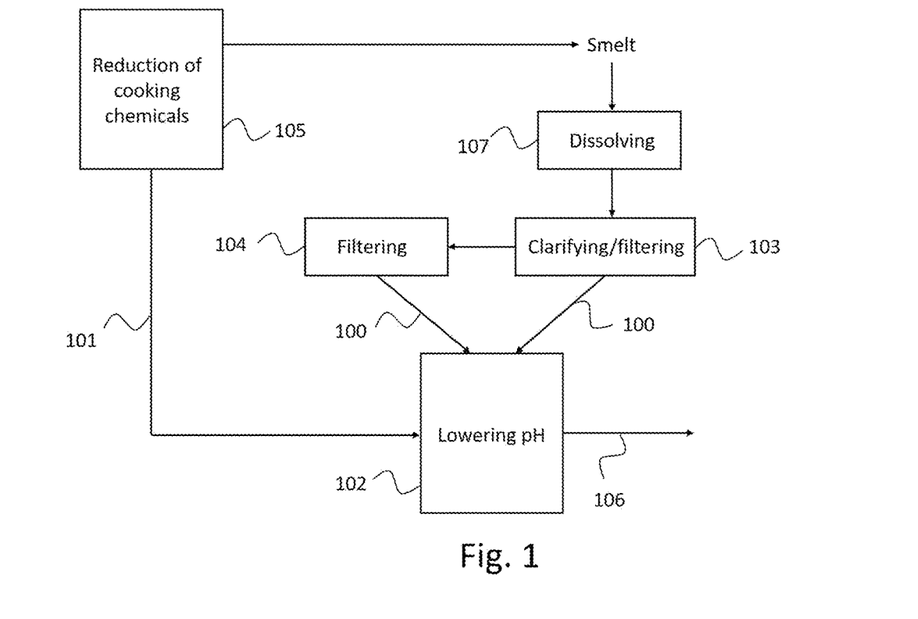
FIG. 1 illustrates, by way of an example, a schematic process flow chart according to an embodiment.

As illustrated by FIG. 1, the slurry containing green liquor dregs 100 may originate from a green liquor clarifier/filter 103 and/or a dregs filter 104. The slurry containing green liquor dregs 100 preferably refers to a slurry resulting from clarification and/or filtration of green liquor. As illustrated by FIG. 1, upstream of the green liquor clarifier/filter 103 the smelt originating from a recovery boiler 105 is in a smelt dissolving tank 107 dissolved to produce the green liquor. Principles of the green liquor clarifier/filter 103 and the dregs filter 104 are disclosed above. The smelt is produced in a recovery boiler, as disclosed above.

The disclosed method does not require any pre-treatment of the green liquor dregs. The slurry containing green liquor dregs originating for example from a green liquor clarifier/filter and/or a dregs filter may be treated as such in the method disclosed herein. This saves time as no additional steps are needed to dry the dregs, for example, and reduces costs, energy and/or materials. The method does not require external materials to be used, but is a representative of a circular economy approach utilizing solely waste streams, i.e. the green liquor dregs and flue gas.

Main chemical reactions taking place when contacting the slurry containing green liquor dregs with flue gas involve oxides and hydroxides. For example, $Mg(OH)_2$ of the dregs reacts with $CO_2$ of the flue gas forming various complex magnesium-carbonate compounds. Also, CaO of the dregs may react with $CO_2$ of the flue gas forming $CaCO_3$. In a case the flue gas contains $SO_2$, magnesium and/or calcium sulphates may be formed.

The reactions between $CO_2$ and oxides and hydroxides are exothermic, i.e. they release heat. Thus, no external energy is required. Moreover, significant part of the water contained by the dregs and/or the slurry may be evaporated in the process. This may reduce the need to dry the treated dregs with other methods, thus reducing costs and saving energy.

Further, the reaction between $Mg(OH)_2$ and $CO_2$ produces $MgCO_3$. This may improve the dewatering properties of the green liquor dregs. $Mg(OH)_2$ is known to provide the dregs with poor dewatering properties. $Mg(OH)_2$ is a gelatinous compound, which makes it difficult to filter and settle and it may be responsible for plugging filters. As at least part of the $Mg(OH)_2$ of the dregs may react with $CO_2$ of the flue gas to produce $MgCO_3$, the amount of the $Mg(OH)_2$ in the dregs may be reduced, and thus the use of energy in the possible dewatering stages taking place after the method steps disclosed herein may be reduced.

The slurry containing green liquor dregs may have a pH of for example between 10-13. After contacting with the flue gas, the pH is reduced. The pH of the green liquor dregs after contacting with the flue gas, namely the treated green liquor dregs, may be for example between 7-9.

Dry solids content of the slurry containing green liquor dregs may be from 1 to 40 wt. %. Preferably, the dry solids content of the slurry containing green liquor dregs is from 1 to 20 wt. %.

The flue gas 101 may originate from a recovery boiler 105, as illustrated in FIG. 1. In principle, the flue gas 101 may originate from anywhere in the pulp mill district. Besides recovery boiler 105, at least lime kiln and power boiler of the pulp mill may be the origin of the flue gas 101. The flue gas 101 may originate from the recovery boiler 105 that produces the smelt, from which the green liquor containing the dregs is produced. Preferably, the flue gas 101 is directed to the process after having been treated by an electrostatic precipitator for removing particles, like dust and smoke from the flue gas 101.

The flue gas refers to a combustion exhaust gas. The flue gas may contain at least carbon dioxide ($CO_2$), oxygen ($O_2$), water vapor ($H_2O$) and nitrogen ($N_2$). Further, it may contain for example carbon monoxide, nitrogen oxides, sulphur oxides and hydrogen chloride. The flue gas may originate from burning of renewable fuels, such as gasified bark or black liquor. Gasified bark refers to a product gas of bark gasification.

The flue gas may comprise at least one of the following: at least 5 vol-% of $CO_2$, at least 10 vol-% of $H_2O$, at least 40 vol-% of $N_2$.

In an example, a flue gas content may be as follows: 12.94 vol-% of $CO_2$, 15.13 vol-% of $H_2O$, 3.03 vol-% of $O_2$, 0.01 vol-% of $SO_2$ and 68.89 vol-% of $N_2$.

According to an embodiment, a temperature of the slurry containing green liquor dregs is at most 150° C. and a temperature of the flue gas is at most 400° C. The above presented temperatures refer to the temperatures prevailing immediately before contacting the slurry containing green liquor dregs with the flue gas according to the method presented in here.

Contacting the slurry containing green liquor dregs with flue gas may be performed in any suitable manner.

According to an embodiment, the flue gas 101 is bubbled into the slurry containing green liquor dregs 100. The slurry containing green liquor dregs 100 originating from a green liquor clarifier/filter 103 and/or a dregs filter 104 is conveyed into a vessel 102. The flue gas 101 is directed into the vessel 102.

Figure 2:
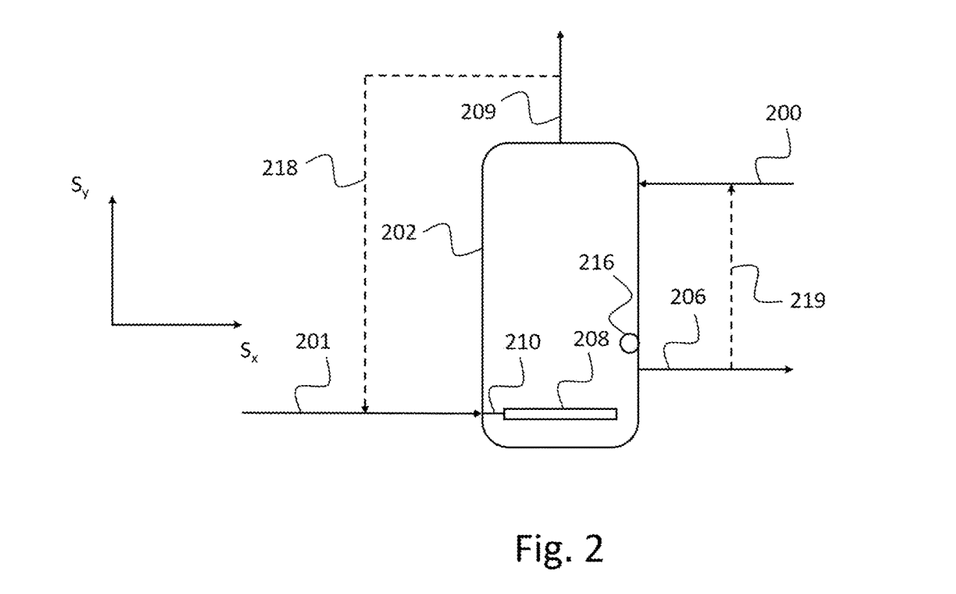
FIG. 2 illustrates, by way of an example, a system according to an embodiment.

According to an embodiment illustrated by FIG. 2, the vessel 202 is a bubble column reactor. The system comprises a gas inlet 210 configured to convey the flue gas 201 into the vessel 202 for contacting with the slurry containing green liquor dregs 200. The flue gas 201 in form of bubbles is arranged to come into contact with the slurry containing green liquor dregs 200, and the chemical reactions between the flue gas components and the compounds of the dregs and/or the slurry take place. Resulting gas(es) 209 may be let out via a chimney and/or flue gas cleaning. Resulting treated green liquor dregs 206 may be collected and dried, when necessary.

The bubble column reactor is an apparatus for generating and controlling gas-liquid chemical reactions. It may comprise a vertically arranged cylindrical column for filling with a liquid. Gas may be directed into the column at the bottom, as illustrated by FIG. 2. Introduction of gas at the bottom of the column causes a turbulent stream to enable an optimum gas exchange. The mixing may be performed by gas sparging by a gas sparger 208. The gas sparging requires less energy than mechanical stirring. However, good mixing is needed for the chemical reactions to occur.

The system may further comprise a pH sensor 216 arranged inside the vessel 202 for monitoring the pH of the slurry containing green liquor dregs. As illustrated by dashed lines in FIG. 2, the system may comprise further lines for recirculating the substances. The system may comprise a line 219 for recirculating at least some of the treated green liquor dregs for retreatment. In a case pH of the treated green liquor dregs is not on a desirable level, it is thus possible to allow the treated green liquor dregs 206 to be contacted with the flue gas 201 again by circulating them back to the vessel 202. Additionally or alternatively, at least some of the resulting gas(es) 209 may be led via line 218 to be conveyed into the vessel 202 for contacting again with the slurry containing green liquor dregs 200. Further, pH of the treated green liquor dregs may be adjusted by controlling the amount of treated green liquor dregs collected from the vessel 202.

Figure 3:
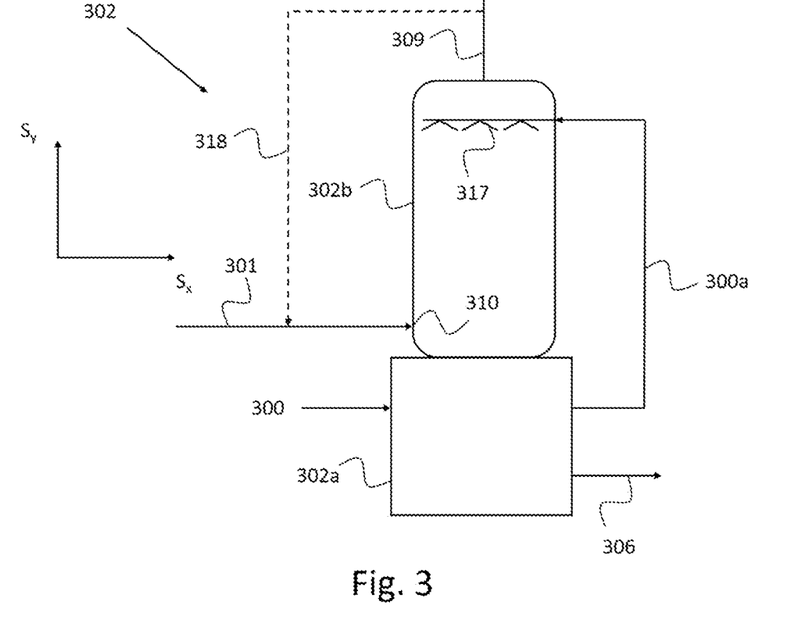
FIG. 3 illustrates, by way of an example, a system according to another embodiment.

According to another embodiment illustrated by FIG. 3, a system for adjusting pH of green liquor dregs is of a scrubber-type. The system comprises a vessel 302 for contacting the slurry containing green liquor dregs 300 and the flue gas 301. The vessel 302 is a scrubber. The slurry containing green liquor dregs is conveyed to a bottom part of the scrubber 302a. The bottom part of the scrubber 302a is preferably equipped with an agitator. The slurry containing green liquor dregs 300 is circulated from the bottom part of the scrubber 302a via line 300a into an upper part of the scrubber 302b, from which it is sprayed in a counter-current manner to the flue gas 301 fed into the scrubber, as illustrated in FIG. 3. After contacting with the flue gas 301 the slurry now containing treated green liquor dregs returns back to the bottom part of the scrubber 302a. The system may further comprise a pH sensor in the bottom part of the scrubber 302a for monitoring the pH of the slurry containing green liquor dregs. Whereupon the pH of the slurry containing green liquor dregs in the bottom part of the scrubber 302a is desired, the treated green liquor dregs 306 may be collected and dried, when necessary. As illustrated by a dashed line in FIG. 3, at least some of the resulting gas(es) 309 may be led via line 318 to be conveyed into the upper part of the scrubber 302b for contacting again with the slurry containing green liquor dregs 300.

Figure 4:
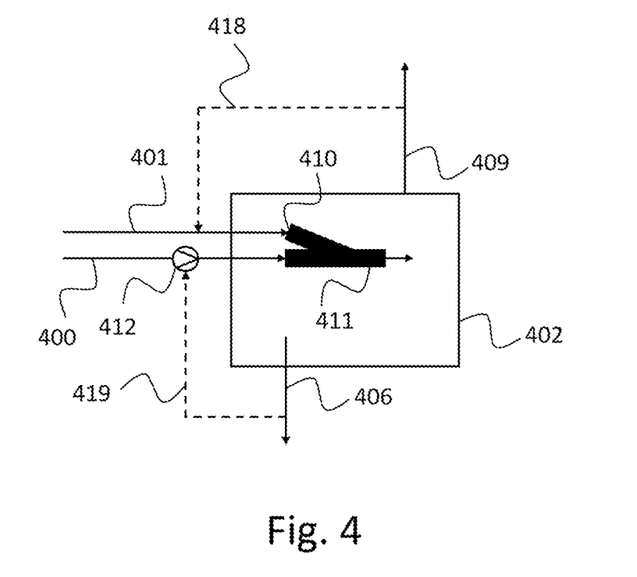
FIG. 4 illustrates, by way of an example, a system according to yet another embodiment.

According to yet another embodiment illustrated by FIG. 4, the flue gas 401 and the slurry containing green liquor dregs 400 are directed to an injector arrangement 411 and the slurry containing green liquor dregs 400 and the flue gas 401 are mixed in the injector arrangement 411. A gas inlet 410 is configured to convey the flue gas 401 into the injector arrangement 411. Besides the injector arrangement 411, the system comprises a pump arrangement 412. The injector arrangement comprises at least one injector. By using at least a pump of the pump arrangement 412, the flow of the slurry containing green liquor dregs through an injector of the injector arrangement 411 generates suction at the gas inlet 410. In this way, the flue gas 401 is sucked into the injector arrangement 412, and the flue gas 401 becomes mixed with the slurry containing green liquor dregs 400. The injector arrangement 411 may be arranged inside the vessel 402, as illustrated in FIG. 4. Alternatively, the injector arrangement 411 may be arranged outside the vessel 402. In that case the injector arrangement 411 is however arranged to supply the slurry containing green liquor dregs 400 and the flue gas 401 into the vessel 402. As a result, treated green liquor dregs 406 are formed, and may be collected and dried, when necessary. Resulting gas(es) 409 may be let out via a chimney and/or flue gas cleaning.

As illustrated by dashed lines in FIG. 4 the system may comprise further lines for recirculating the substances. The system may comprise a line 419 for recirculating at least some of the treated green liquor dregs for retreatment. In a case the pH of the treated green liquor dregs is not on a desirable level, it is thus possible to allow the treated green liquor dregs 406 to be contacted with the flue gas 401 again by circulating them from the vessel 402 back to the injector arrangement 411 via the pump arrangement 412. Additionally or alternatively, at least some of the resulting gas(es) 409 may be led via line 418 to be conveyed via the gas inlet 410 into the injector arrangement 411. Further, pH of the treated green liquor dregs may be adjusted by controlling the amount of treated green liquor dregs collected from the vessel 402.

Figure 5:
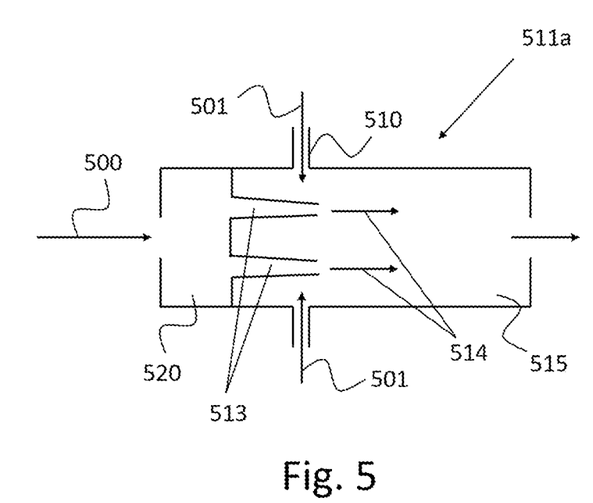
FIG. 5 illustrates, by way of an example, an injector for a system according to an embodiment.

Working principle of an injector 511a is illustrated by FIG. 5. The injector arrangement 411 of FIG. 4 may comprise an injector 511a or more than one injectors 511a. The injector 511a comprises an inlet for receiving the slurry containing green liquor dregs 400, 500 from the pump arrangement 412 (see FIG. 4). The injector 511a comprises a first chamber 520 for receiving the slurry containing green liquor dregs 400, 500 via the inlet from the pump arrangement 412 and a jet nozzle 513 for forming a jet 514 of the slurry containing green liquor dregs. The injector 511a comprises a second chamber 515 arranged, in flow direction of the slurry containing green liquor dregs, downstream from the first chamber 520. The injector 511a further comprises an outlet arranged at the second chamber 515 for expelling the slurry and the flue gas from the second chamber 515.

The injector 511a is arranged to let out the slurry containing green liquor dregs 400, 500 into the vessel 402. The injector 511a further comprises a gas inlet 410, 510 configured to convey the flue gas 401, 501 into the second chamber 515 by suction generated by flow of the slurry containing green liquor dregs through the jet nozzle 513. The pump arrangement 412 is configured to pump the slurry containing green liquor dregs 400, 500 via the injector arrangement 411 to the vessel 402 in such a manner that pumping of the slurry containing green liquor dregs through the jet nozzle 513 generates the jet 514 and suction at the gas inlet 410, 510.

According to an embodiment, a vessel 402 and an injector 511a may be combined such that a part of the vessel serves as the second chamber. Correspondingly, a separate second chamber is not necessary. In such a case, the second chamber of the injector 511a forms a part of the interior of the vessel. In such a case the jet 514 of the slurry and the flue gas would be formed directly into the vessel 402.

According to an embodiment, the method comprises pumping a slurry containing green liquor dregs 400, 500 into an injector arrangement 411 using a pump arrangement 412, the injector arrangement 411 comprising at least one injector 511a. The slurry is pumped in such a manner that the pumping of the slurry through the jet nozzle 513 generates suction at the gas inlet 510 of the injector 511a, whereby flue gas 501 is conveyed into a second chamber 515 (or vessel 402) and mixed with the slurry to generate bubbles of the flue gas into the slurry. In this manner, the slurry is treated by chemical reactions occurring at interfaces of the bubbles and the slurry.

In all embodiments, the system may comprise a pH sensor arranged to monitor pH of the slurry containing treated green liquor dregs and/or pH of the treated green liquor dregs. The system may also comprise a processor for controlling the system. Further, the system may comprise a valve for controlling the amount of the treated green liquor dregs expelled from the vessel and a processor for controlling the valve. The system may also comprise any necessary components, such as further pumps, lines, sensors, valves and processors for implementing the invention disclosed in here. The system need not comprise a pH sensor.

In an exemplary, calculated embodiment, a slurry containing green liquor dregs having a dry solids content of 30 wt. % and a temperature of 80° C. was contacted with flue gas having a temperature of 150° C. Theoretical compositions of the green liquor dregs and the flue gas are presented in Table 1.

TABLE 1

| Dregs | kg | Flue gas | kg |
|---|---|---|---|
| $CaCO_3$ | 20 | $CO_2$ | 20 |
| CaO | 1 | $SO_2$ | 1 |
| $Mg(OH)_2$ | 20 | $O_2$ | 5 |
| $H_2O$ | 100 | $H_2O$ | 10 |
|  |  | $N_2$ | 100 |

Before contacting with the flue gas, the pH of the green liquor dregs was 10.8. After contacting with the flue gas, in an equilibrium state calculation, the pH was reduced to 7.5. The reduction of $SO_2$ in the flue gas was 100%, and the reduction of $CO_2$ 40%. In a case the green liquor dregs had higher CaO and/or $Mg(OH)_2$ content, the reduction of $CO_2$ would be higher. A dry solids content of the treated green liquor dregs was about 56%.

In another exemplary, calculated embodiment, wherein a dry solids content of a slurry containing green liquor dregs was 10 wt. % (amount of water 370 kg) and the pH of the dregs before treatment and after the treatment were the same as in the above presented example, the reductions of $SO_2$ and $CO_2$ in the flue gas were the same (100% and 40%, respectively) and a dry solids content of the treated green liquor dregs was about 15%.

The chemical composition of the green liquor dregs varies from mill to mill, but due to alkalinity of the dregs, the dregs always contain compounds capable of reacting with $CO_2$.

The green liquor dregs treated by the method presented above have a neutral pH or a pH of slightly above neutral. The pH of the treated green liquor dregs 106, 206, 306, 406 may be between 7-9, preferably between 7-8. Thus, the pH of the green liquor dregs may be lowered by the method presented above from a pH of 10-13 to a pH of 7-9.

The dry solids content of the treated green liquor dregs preferably is higher than before treatment by the method. Thus, the need for further drying of the treated green liquor dregs may be reduced or even removed. As a rule of a thumb, it can be mentioned that in a case of the dry solids content of the untreated green liquor dregs is about 1-10 wt. %, further drying is needed to enable a proper usability of the treated dregs.

Sometimes it may be beneficial to treat the green liquor dregs by removing, or at least reducing the content of, heavy metals (such as Cd, As). This may be performed for the green liquor dregs treated by the method presented above. Alternatively or additionally this kind of treatment may precede the method disclosed above.

The heavy metal content of the green liquor dregs may also be decreased by the method itself. Decrease in the pH of the green liquor dregs caused by contacting with the flue gas may improve leachability of heavy metals, such as Cd, Pb, Zn, As and Sb. In the literature, significant improvement in leachability of heavy metals has been demonstrated at pH below 9 when compared to higher pH. This means that decrease in the pH may cause a higher fraction of heavy metals to transfer from the solids to the liquid part of the dregs. In a case the liquid part is at least partly removed subsequentially, the heavy metal content of the remaining dregs may be lower than of the ones before the treatment.

Green liquor dregs treated by the method disclosed above find use for example as forest fertilizer. Untreated green liquor dregs are often not useable as fertilizer because of the high pH of the dregs. However, by the treatment of the dregs the pH is lowered to a state that enables the use of the dregs as fertilizer. Further, the dregs may find use for example as filling material and in land construction. As discussed above, the decrease in the heavy metal content of the dregs as a result of the method used may further enable the use of the dregs as fertilizer.

Thus, a benefit of the disclosed method is to turn the green liquor dregs from a landfilled waste to a recyclable material via a significant reduction in the pH of the dregs.

Another benefit of the method is the possibility to bind harmful emissions into the dregs. The $SO_2$ contained by the flue gas can be bound very effectively by the method. Further, at least part of the $CO_2$ can be bound. For pulp mills using solely renewable fuels in their operation, it is possible to make the mills $CO_2$ negative by utilizing the method. Normally, specially manufactured chemicals are required for $CO_2$ capture, but the chemicals may be replaced by the treated dregs. Thus, the additional costs relating to the use of chemicals would be reduced.

A further benefit relates to the reduction of costs associated with the drying of the dregs. As the reactions occurring between the flue gas and the dregs release heat, the heat may be used to evaporate the water in the dregs.

Further, by the method disclosed herein it is possible to convert all the dregs waste by changing it completely to a usable product.

The invention claimed is:

1. A method for adjusting pH of a slurry containing green liquor dregs, the method comprising the step of:
   contacting a slurry containing green liquor dregs (100, 200, 300, 400, 500) with flue gas (101, 201, 301, 401, 501),
   wherein:
      the slurry containing green liquor dregs (100, 200, 300, 400, 500) is a slurry obtained solely from at least one of a green liquor clarifier/filter (103) or a dregs filter (104) configured to separate the slurry containing green liquor dregs (100, 200, 300, 400, 500) from green liquor and has a pH of 10-13,
      a dry solids content of the slurry containing green liquor dregs (100, 200, 300, 400, 500) is from 1 to 40 wt. %,
      the flue gas (101, 201, 301, 401, 501) contains carbon dioxide, and
      a pH of the slurry containing green liquor dregs after contacting with the flue gas (101, 201, 301, 401, 501) is between 7-9.

2. The method according to claim 1, wherein a temperature of the slurry containing green liquor dregs is at most 150° C. and a temperature of the flue gas is at most 400° C.

3. The method according to claim 2, wherein a dry solids content of the slurry containing green liquor dregs is from 1 to 20 wt. %.

4. The method according to claim 2, wherein the method comprises spraying the slurry containing green liquor dregs (300) in a counter-current manner to the flue gas (301).

5. The method according to claim 1, wherein a dry solids content of the slurry containing green liquor dregs is from 1 to 20 wt. %.

6. The method according to claim 5, wherein the method comprises spraying the slurry containing green liquor dregs (300) in a counter-current manner to the flue gas (301).

7. The method according to claim 1, wherein the flue gas (101, 201, 301, 401, 501) originates from a recovery boiler (105).

8. The method according to claim 7, wherein the method comprises spraying the slurry containing green liquor dregs (300) in a counter-current manner to the flue gas (301).

9. The method according to claim 1, wherein the flue gas (101, 201, 301, 401, 501) originates from burning of at least a renewable fuel.

10. The method according to claim 9, wherein the method comprises spraying the slurry containing green liquor dregs (300) in a counter-current manner to the flue gas (301).

11. The method according to claim 1, wherein the method comprises bubbling the flue gas (101, 201, 301, 401, 501) into the slurry containing green liquor dregs (100, 200, 300, 400, 500).

12. The method according to claim 1, wherein the method further comprises:
- directing the slurry containing green liquor dregs (100, 200, 300, 400, 500) and the flue gas (101, 201, 301, 401, 501) to an injector arrangement (411); and
- mixing the slurry containing green liquor dregs (100, 200, 300, 400, 500) and the flue gas (101, 201, 301, 401, 501) in the injector arrangement (411).

13. The method according to claim 1, wherein the method comprises spraying the slurry containing green liquor dregs (300) in a counter-current manner to the flue gas (301).

14. The method according to claim 1, wherein the slurry containing green liquor dregs is a non-pretreated slurry.

15. The method according to claim 1, further comprising, after the contacting step, collecting and reusing treated green liquor dregs.

16. The method according to claim 15, wherein the collecting step further comprises recirculating the treated green liquor dregs to an injector arrangement (411).

17. The method according to claim 16, wherein the recirculating involves a subsequent contacting of the treated green liquor dregs with flue gas (101, 201, 301, 401, 501).

* * * * *